United States Patent [19]

Kesselring et al.

[11] 4,135,371

[45] Jan. 23, 1979

[54] STORAGE ELEMENT FOR A SORPTION HEAT STORAGE SYSTEM

[76] Inventors: Fritz Kesselring, Schiedhaldenstr. 55, 8700 Küsnacht; Siegfried Schilling, Sunnebüelstr. 41, 8604 Volketswil, both of Switzerland

[21] Appl. No.: 796,719

[22] Filed: May 13, 1977

[30] Foreign Application Priority Data

May 18, 1976 [CH] Switzerland .............. 6181/76

[51] Int. Cl.² .............. F25B 17/00; F25B 19/00; F28D 13/00
[52] U.S. Cl. .............. 62/477; 62/514 R; 62/119; 165/104 S; 165/DIG. 17
[58] Field of Search .............. 62/119, 477, 514; 165/104 S, DIG. 17; 126/400

[56] References Cited

U.S. PATENT DOCUMENTS

| 1,698,847 | 1/1929 | Keyes | 62/477 |
| 1,833,901 | 12/1931 | Hull | 62/477 |
| 1,960,824 | 5/1934 | Munters | 62/477 |
| 2,326,130 | 8/1943 | Kleen | 62/477 |
| 3,517,730 | 6/1970 | Wyatt | 62/514 |
| 3,561,525 | 2/1971 | Baer | 62/514 |

Primary Examiner—Lloyd L. King
Attorney, Agent, or Firm—Kenyon & Kenyon, Reilly, Carr & Chapin

[57] ABSTRACT

This invention relates to a storage element for a sorption heat storage system comprising a hermetically sealed tubular vessel having a length which is a multiple of its cross section containing a sorbate. The vessel is divided into two regions by an interspace. A first region contains a solid sorption medium and a second region contains an accumulator to collect condense and hold back sorbate driven out of the sorption medium.

The invention also relates to a heat storage system consisting of a tank, a plurality of heat storage elements arranged in a parallel array with their interspaces in a plane, a means to divide the tank into two regions outside the elements, lying in the plane of the interspaces and at least one heat transfer media contained in the tank outside the storage elements.

24 Claims, 12 Drawing Figures

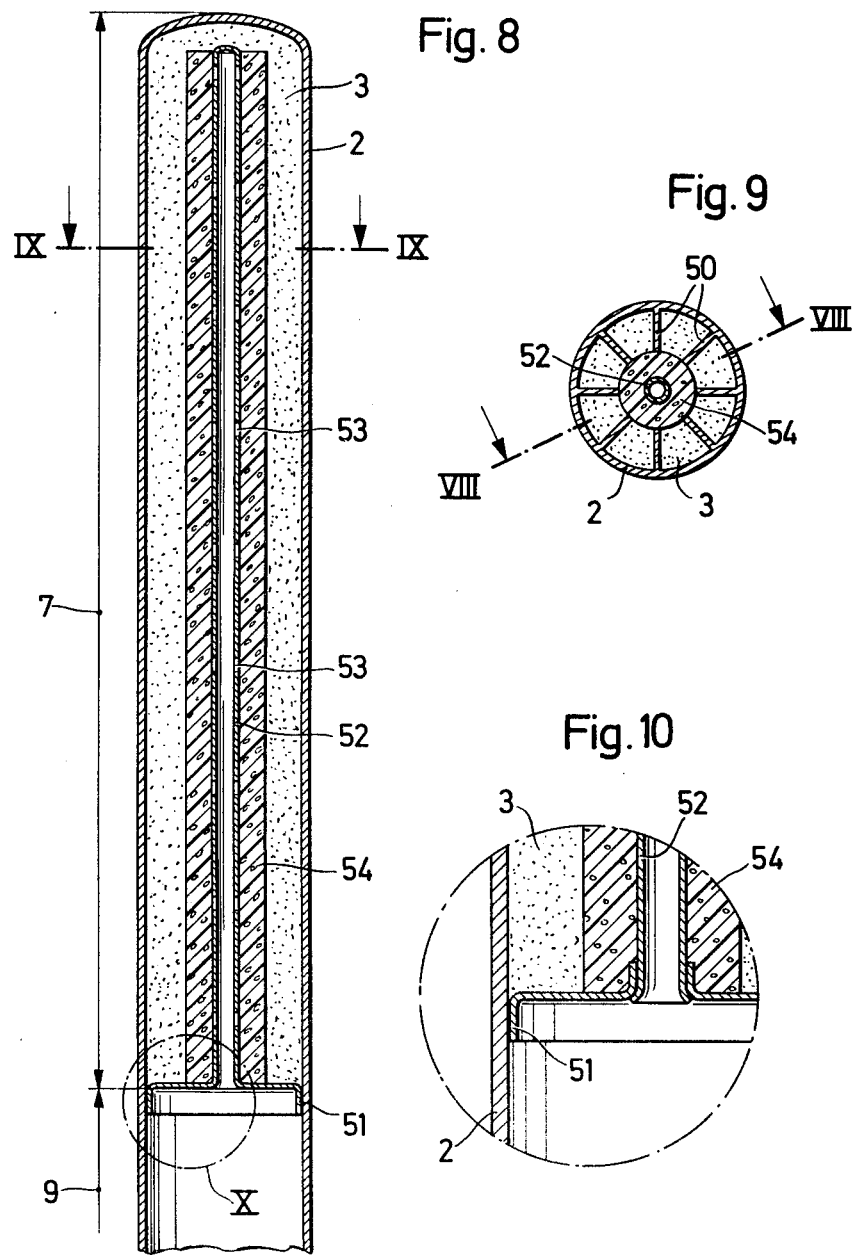

STORAGE ELEMENT FOR A SORPTION HEAT STORAGE SYSTEM

This invention relates to a storage element for a sorption heat storage system in which, on the one hand, a solid is provided as the sorption medium and, on the other hand, an accumulator for the sorbate (the absorbed substance) which is driven out of the sorption medium and may be condensed. The invention relates further to the use of such storage elements in the construction of accumulators and installations of large capacity.

Sorption heat storage systems have already been proposed, e.g. G. Alefeld, "Energy Storage by Heterogeneous Evaporation", "Waerme", Vol. 81, No. 5, pgs. 89 to 93. These systems operate according to the principle of absorption refrigerators; where systems of substances are used in which desorption and absorption exhibit maximum heat exchange characteristics. Such systems of substances are, for instance, iron or calcium chloride as the sorption medium and ammonia or methylamine as the sorbate or absorbed substance. In the technical realization of the storage systems mentioned, practical difficulties are encountered which are caused, among other factors, by the poor thermal conductivity of the (loaded or unloaded) solid sorption agents or the low transport velocities of the absorbed substance into or out of the sorption agent, as well as low reaction velocities in desorption and absorption. Overcoming these difficulties has heretofore necessitated large expenditures for apparatus for high pressures and large temperature differences which are necessary for the supply of the heat into the sorption material and the removal of heat from it, as well as relatively large heat transfer surfaces. A further difficulty inherent in the system is caused by the swelling of the sorption medium in absorbing the substance to be absorbed resulting in considerable swelling pressure.

It is an object of the invention to mitigate, to a large extent, the described system related difficulties and to provide a storage element of the simplest possible design for the systems mentioned. According to the invention, this problem is solved by the provision that the sorption medium and the accumulator are arranged together, but spatially separated, by an intermediate space (interspace), in a subregion of a hermetically sealed tubular vessel, the length of which is several times its crosswise dimensions.

According to the present invention, the heat storage system is resolved into many elements of small volume, whereby long heat transport paths within the sorption medium are avoided. In addition, due to their tubular shape, the elements are simple and rugged, which facilitates their fabrication and handling. Due to the form chosen, it is further possible to keep the heat losses, occuring between the subregion containing the sorption medium and the subregion serving as the accumulator for the substance to be absorbed, as low as possible. The design is a sealed tube but provides high pressure strength for the vessel, whereby both the relatively high operating pressure and the mentioned swelling pressures can be controlled in a simple manner.

In order to improve the separation of the sorption medium from the stored substance to be absorbed, a vapor permeable separation element is provided in the space between the accumulator and the sorption medium. The transport of the absorbed substance in the sorption medium can further be improved during desorption and absorption if a system of flow paths for the gaseous or vaporous absorbed substance is provided in the sorption medium for which purpose the sorption medium may, for instance, be given the form of a porous body with open pores or be permeated by a system of porous canals.

The heat transfer between the sorption medium and the environment can be improved if heat-conducting structures are provided in the sorption medium. For this purpose, the sorption medium can be loaded with metal chips which are connected to the metal vessel in a heat-conducting manner, e.g. by welding. A further possibility is to make the vessel of a tube with internal ribs in the subregion filled with the sorption medium.

The previously mentioned heat losses in the longitudinal direction of the vessel can be reduced further if the vessel consists of non-metallic material such as glass or plastic.

It may further be advantageous if the accumulator is filled at least partially with a material which acts as an adsorber, such as one with capillaries, e.g. activated carbon or diatomaceous earth. In such a structure, the liquified substance to be absorbed can be held and bound in the subregion of the accumulator, which makes the application of the element independent of its position in space. The element can therefore also be arranged in horizontal position.

The use of a storage element is characterized, according to the invention, by the feature that a number of storage elements are arranged parallel to each other in at least one tank in such a manner that their interspaces lie in one plane. A partition is arranged in this plane of the tank outside the elements. The media for heat transfer and/or heat storage fill the container, at least partially, outside the storage elements.

It is advantageous to use a liquid as the heat transfer medium having a boiling temperature which is higher than the drive-out temperature of the absorbed substance from the sorption medium prevailing at the chosen pressure. In the system of substances mentioned at the outset, such a liquid is, for example, water. It may further be advantageous to provide means which cause forced circulation of the heat transfer media.

In order to increase the amount of heat which must be removed from the condensation of the substance to be absorbed matter in the accumulator, one can fill that part of the tank in which the subregion of the storage elements filled with liquid substance to be absorbed is located with a heat storage medium which undergoes a phase conversion at the temperature of said liquid substance. The heat source necessary for evaporating the substance to be absorbed when the heat storage system is discharged, may advantageously be the condenser of a refrigerator.

In some cases, finally, it may be advantageous to make the partition of the container of plastic matter, such a design of the partition brings about, in particular, advantages in the fabrication and assembly of the container.

One object of the invention is to make sorptive heat storage elements with good thermal conductivity using a solid sorption medium.

It is a further object of the invention to make a sorptive heat storage element having high transport velocities of the absorbed substance into and out of the sorption medium and high reaction velocities in desorption and absorption.

It is a further object of the invention to make sorptive heat storage element that is easy to fabricate and yet can withstand the pressures inherent in the sorptive heat storage process.

It is a further object of the invention to make a heat storage system which utilizes a number of sorptive heat storage elements.

It is a further object of the invention to make a heat storage system which can utilize relatively low level heat sources such as the environment.

Briefly, the invention provides a heat storage element for a sorptive heat storage system which consists of a hermetically sealed vessel, having a length which is a multiple of its cross section, which is divided into two subregions by an interspace. The vessel contains a sorbate. The first subregion contains a solid sorption medium to absorb sorbate and the second subregion contains an accumulator to collect, condense and hold back sorbate driven out of the sorption medium.

These and other objects and advantages of the invention will become more apparent from the following detailed description and appended claims taken in conjunction with the accompanying drawings in which:

FIG. 8 shows an embodiment of the new storage element containing the sorption agent, in a cross-sectional view taken on line VIII—VIII of FIG. 9;

FIG. 9 shows the cross section of the element in FIG. 8 taken along section line IX—IX of FIG. 8; and FIG. 10 shows an enlarged detail from FIG. 8.

Figure 1A:
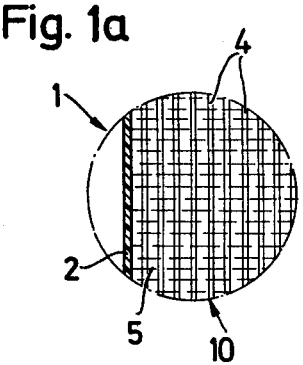
FIG. 1a shows a detail of FIG. 1 on an enlarged scale.
Figure 1:
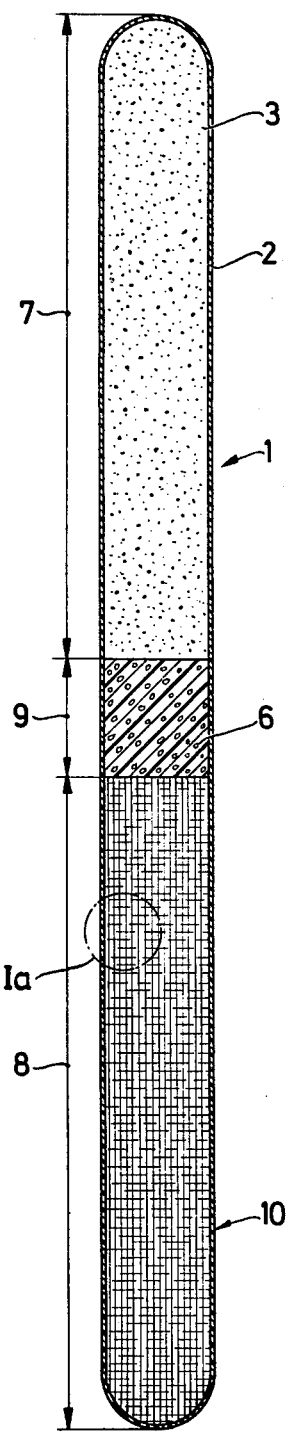
FIG. 1 shows schematically a longitudinal section through a storage element.

Referring to FIG. 1, the storage element 1 consists of a tubular vessel 2 which is hermetically sealed on all sides and is made, for instance, of metal, glass or a plastic material. In the upper subregion 7 of the vessel 2, there is a solid serving as the sorption medium 3, e.g. calcium chloride, while the lower subregion 8 serves as an accumulator 10 for the at least partially liquified substance to be absorbed, e.g. ammonia.

The accumulator 10 is formed by a substance 4 with capillary structure, in which the liquid substance to be absorbed (sorbate) 5 is bound by capillary forces which are larger than the force of gravity acting on said liquid substance. The capillary forces cause the liquified substance 5 to be held back in the accumulator 10 if the element is not used in the position in space shown, but for instance, horizontally.

The space g between the two subregions 7 and 8 is filled in the example shown with a gas- or vapor-permeable separation element (plug) 6, which consists, for example of foam rubber. The separation element 6 can also be compressible in order to allow volume expansion of the upper subregion 7 for partial compensation of the swelling pressure during the absorption of the absorbed substance, if swelling sorption media are used.

The long, relatively thin tube shape of element 1 results in high pressure strength with little material required, which simplifies the control of the increased operating pressures and the swelling pressure. The small wall thickness has the further advantage that the heat loss between the relative long housing parts on both sides of the plug 6, which have different temperatures, becomes relatively low. This heat loss can be reduced still further if the vessel 2 consists of glass or plastic material instead of metal.

A further advantage is the simplicity of fabrication of tubes as compared with pressure-resistant vessels equipped with heat exchangers. In addition, greater pressure safety is obtained with the tubes.

To improve the heat flow in the sorption medium 3, the sorption medium 3 can be loaded with metal chips, e.g. iron chips, this is not specifically shown. To improve heat transfer to the vessel 2 and beyond, these chips may be connected to the inside wall of the vessel 2 in a heat-conducting manner, for example by welding. Another possibility to increase the heat flow into or from the sorption medium 3 is to fabricate at least the upper subregion 7 of the vessel 2 from tubes with internal ribs 50 as is known (see FIG. 9).

To improve the transport of the sorbate 5 to be desorbed or absorbed in and through the sorption medium 3, and to improve the reaction velocity of the sorption processes, it is possible to make the sorption agent 3 as a hard porous mass with open pores in a manner known from the technology of absorption refrigerators. As an alternative thereto, flow paths can be provided in the sorption medium 3, as will be described in greater detail later on in conjunction with FIGS. 8 to 10.

A design for a storage element 1 having good heat flow and sufficiently fast gas transport is shown in FIGS. 8 to 10 in which the swelling pressure which occurs during the absorption of the substance to be absorbed, i.e. during the discharge of the storage device can be kept low. As seen in FIGS. 8 to 10, the vessel 2 at the boundary between the subregion 7 and the interspace 9, there is a cap 51 which is firmly connected to the wall of the vessel. The cap 51 supports a long, thin tube 52 which is centrally rolled or welded into it (FIG. 10). The tube 52 goes substantially through the entire sorption medium 3 contained in the subregion 7 in a longitudinal direction and is open at its underside to the interspace 9, and therefore, to the accumulator 10 for the liquified sorbate 5. The tube 52 has openings 53 distributed over its length and its circumference for the passage of the sorbate 5. It is further surrounded by a hollow cylinder 54 of elastic, porous material. Natural or synthetic rubber has been found to be suitable elastomers which are stable in the temperature range from $-40°$ to $+200°$ vis-a-vis the mentioned system of substances and rubber or styrene-butadiene, isobutyls, isoprenes, ethylene propyls or silicones are mentioned as examples for the synthetic elastomers.

As shown in FIG. 9, the space between the wall of the vessel 2, which in the example shown is a commercially available tube with internal ribs 50 (FIG. 9), and the hollow cylinder 54 is filled with the sorption medium 3; the total volume of said space is subdivided by the ribs 50 into relatively small volumes. The tube 52 and the hollow cylinder 54 allow a rapid and uniform distribution or collection of the sorbate which flows into the sorption medium 3 during discharge and out of it during charging while the subdivision by the ribs 50 results in improved heat transfer. Finally, the elasticity of the hollow cylinder 54 enables it to decrease its volume if the pressure in the vessel 2 rises and to take up part of the swelling pressure.

In addition, measures likewise known from refrigeration technology can be used for making available sufficient volume for the swelling of the sorption medium 3 when it absorbs the sorbate 5.

The operation of the arrangement according to FIG. 1 is as follows. Before the operation is started, the sorption medium 3 is saturated with the substance 5 to be absorbed (sorbate) at ambient temperature. If the storage device 1 is to be loaded, i.e. if heat is to be stored, then heat is supplied to the saturated sorption medium 3 via the wall of the vessel 2. As a result, the sorbate 5 is liberated when the desorption or drive-out temperature is reached and flows as vapor through the plug 6 into the substance 4 with capillary structure and is condensed there. In this process, the heat of condensation is given off via the wall of the vessel 2 to a cooling medium and is conducted to a suitable heat sink. The heat sink can serve, for instance any heat consumer in which the condensation temperature produced ensures economical utilization. If an ammoniate is used, e.g. calcium chloride with ammonia added, the latter is decomposed in steps at the liquification pressure of ammonia which can be chosen within certain limits. If ammonia is driven out of the sorption medium $CaCl_2$ at a pressure of 10 bar, then the liquification temperature of the ammonia is 40° C. This means that the temperature of the coolant required for condensation must be less than 40° C., which may present difficulties for economical utilization of the condensation heat. This shortcoming can be avoided if one lets the expulsion process proceed at a higher pressure. For example, if one drives out at 30 bar, then the liquification temperature is 65° C., which permits economical utilization of the condensation heat, e.g. for room heating and/or utility water purification.

The desorption or driving-off process continues under the conditions described above until the sorbate 5 is driven out completely. The amount of heat required for the drivingout process is substantially larger (about twice as large in the case of calcium chloride) than the heat given off to the cooling or condensation medium. The heat difference is stored in the sorption medium 3, partly as capacitive and partly as latent heat.

The absorption or discharge process of the element 1 (heat removal from the element 1) is initiated by first cooling the sorption medium 3 from the expulsion temperature to the corresponding absorption temperature given by the saturation vapor pressure of the sorbate 5. If the temperature falls below this value, the absorption process then sets in with the corresponding development of heat. Both heat components are supplied to a heat consumer, where the necessary heat for evaporating the sorbate 5 is taken from a suitable heat source, e.g. from a refrigeration plant. The discharging process is completed when the sorption medium is saturated with sorbate.

Figure 2:
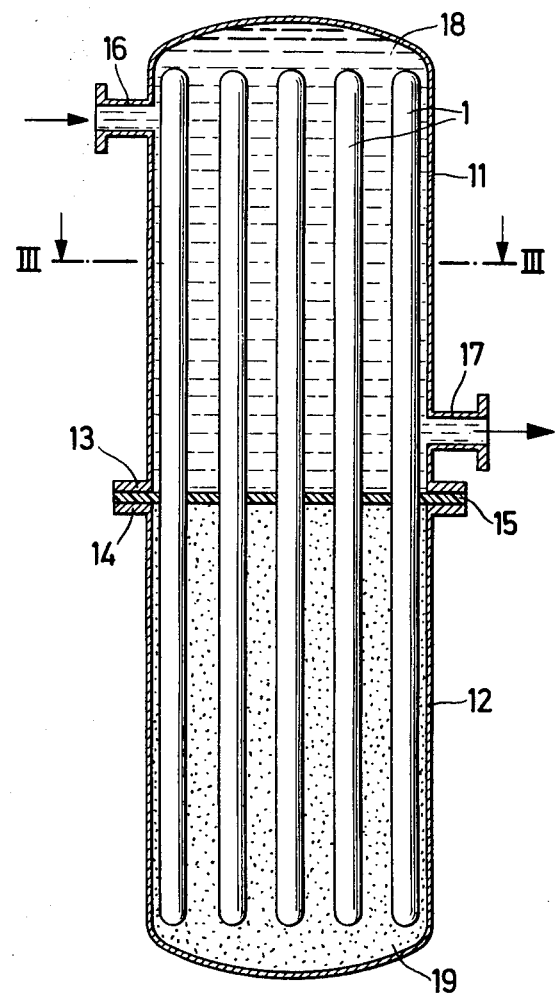
FIG. 2 represents a first example of a tank equipped with the new storage elements in a longitudinal array.
Figure 3:
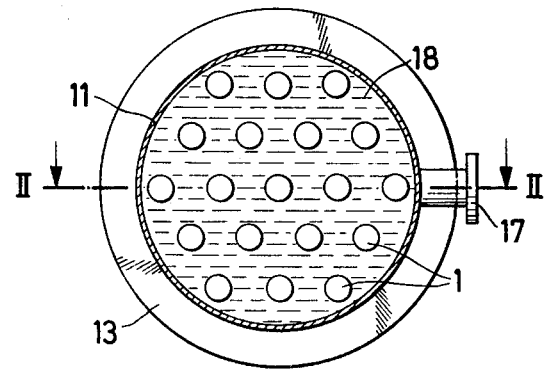
FIG. 3 is a cross-section of the tank in FIG. 2 taken along section lines III—III of FIG. 2.

The sorption heat storage equipment according to FIGS. 2 and 3 contains several storage elements 1 according to FIG. 1 in a tank formed of the parts 11,12. The upper part 11 and the lower part 12 of the tank are connected to each other via flanges 13 and 14 with a partition 15 between the flanges 13,14. Via an inlet stub 16 and an outlet stub 17, the upper part 11 of the tank is connected to a loop (FIG. 6) carrying a heat carrier medium 18 which takes care of the heat transport to and from the elements 1 and may, for instance, be water.

For loading the storage tank, the stubs 16, 17 are connected to a heat source (not shown) while they are connected in a suitable manner to the heat consumer during the discharging process.

In the lower part of the tank there is a solid or liquid heat storage medium 19 which exhibits a phase conversion at the pressure-dependent condensation temperature for the sorbate 5. Substances suited for this purpose are, for example, hydrates of the alkali metals which absorb or liberate, as is well known, large quantities of heat when changing the phase from solid to liquid and vice-versa at a relatively low conversion temperature of about 30 to 50° C.

In principle, the charging process takes place in the same manner as already described in connection with FIG. 1, however, the condensation heat of the sorbate 5 is not discharged to the outside from the lower part 12 of the tank, but is stored in the medium 19.

In discharging the heat storage tank, which is initiated by a temperature drop in the upper part 11 of the tank and thereby by an initial pressure drop for the sorbate 5 in the element 1, the heat stored in the storage medium 19 causes the sorbate 5 to evaporate. The subsequent exothermic absorption reaction between the sorption medium 3 and the sorbate 5 in the upper part 11 of the tank heats, as already described, the reaction product generated (calcium chloride/ammoniate in the system of substances mentioned above) to a substantially higher temperature than that of the heat storage medium 19. For the system of substances mentioned, and with the evaporation temperature of the ammonia being 30° C. corresponding to a pressure of 12 bar, the associated temperature in the sorption medium 3 for complete saturation of the calcium chloride with 8 $NH_3$ is, for instance, 85° C. At this temperature, the heat stored in the system can therefore be given off to a consumer.

Figure 4A:
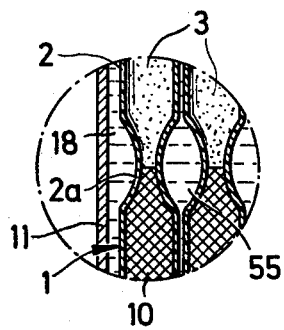
FIG. 4a shows an enlarged detail of FIG. 4.
Figure 4:
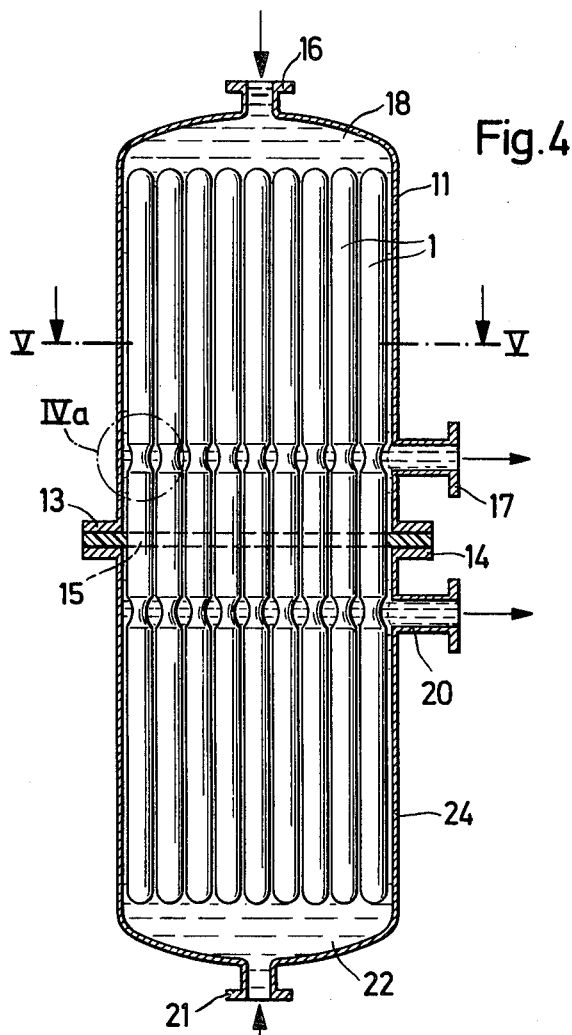
FIG. 4 shows a view taken on line V—V of FIG. 5 of a second tank equipped with the new storage element in a longitudinal array as in FIG. 2.
Figure 5:
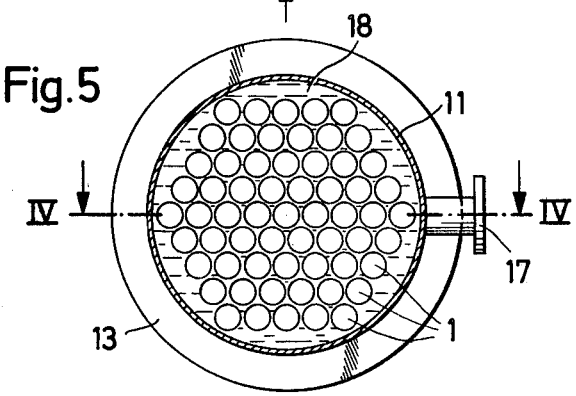
FIG. 5 shows a cross-section of the tank in FIG. 4 taken along section lines V—V of FIG. 4.

As shown in FIGS. 4 and 5, the tank has a denser arrangement of the storage elements 1b than the tank in FIGS. 2 and 3. The upper part 11 of the tank (desorber-absorber) in FIGS. 4 and 5 corresponds to that as described in FIGS. 2 and 3, while the lower part 24 of the tank (condenser-evaporator) differs from that according to FIG. 2 in that it is not filled with a storage medium 19 but is likewise in a loop (FIG. 7) of a heat carrier medium 22 via connecting stubs 20 and 21. The storage elements 1b in FIG. 4 are similar to elements 1 described in FIG. 1 and they are in contact with the media 18 and 22, which are separated from each other by the partition or intermediate wall 15. At the interface between the space 9 and the sorption medium 3 and the accumulator 10 in storage element 1b, respectively (FIG. 1), the storage elements 1 have a reduced cross section to form constrictions 2a. These constrictions 2a may be rolled or drawn in. Even if the storage elements are bundled with the densest packing, free cross sections are thus obtained between them whereby collection or deflection chambers 55 for the heat transfer media 18 and 22 are created. In this manner, uniform action of the media 18 and 22 on the entire tube surface of the elements 1b is made possible even if they are densely packed.

The upper part 11 of the tank again has the two functions of absorbing heat during the charging process and giving off heat during the discharging process. In the lower part 24 of the tank, the condensation heat is removed in the charging process and the evaporation heat is supplied in the discharging process.

Figure 6:
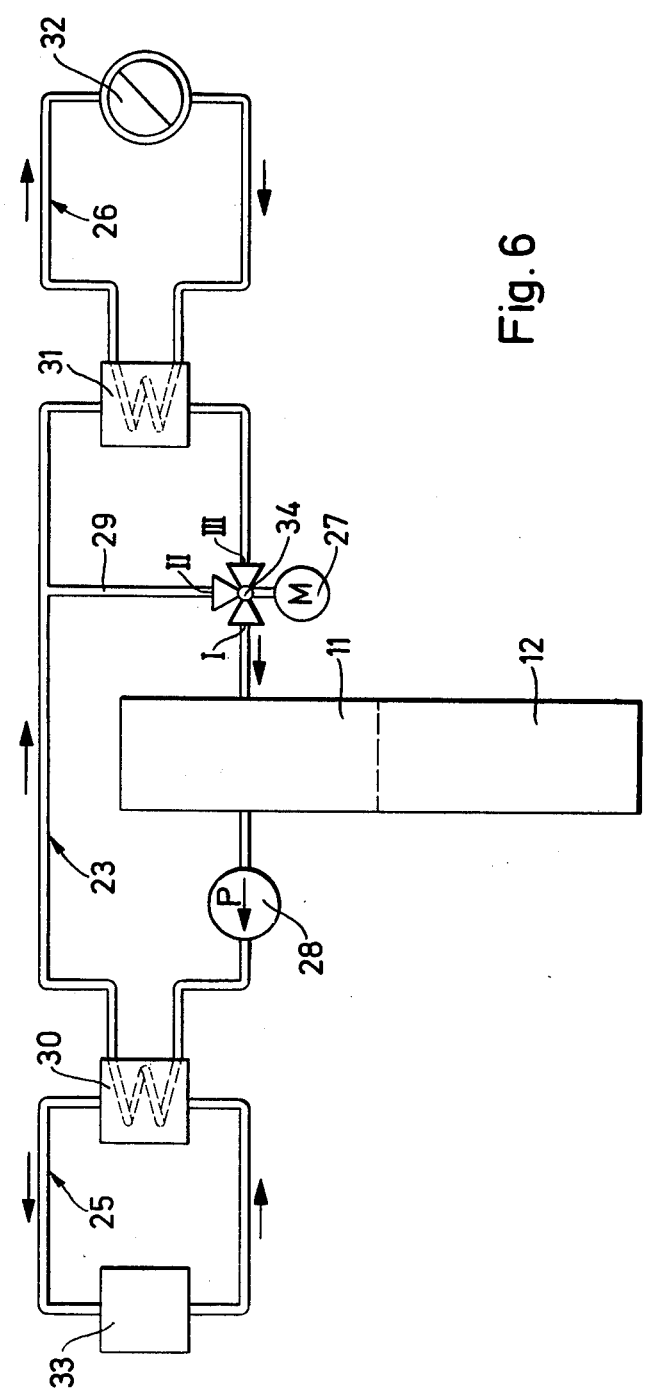
FIG. 6 is a block diagram of a heat storage system in which a tank according to FIG. 2 is used.

FIG. 6 shows the arrangement of a tank 11,12 according to FIG. 2 as a desorber-absorber and condenser-evaporator, respectively, in the schematically shown heat storage system. In the heat storage system, the heat carrier or transfer medium 18 is circulated by means of a circulating pump 28 in a loop 23, which contains on the one side a heat exchanger 30 and on the outer side, a heat exchanger 31. The heat exchanger 30 is connected via a heating loop 25 to a heat generator 33 which, in turn, heats the carrier medium 18 in loop 23 which is connected to heat exchanger 31. Heat exchanger 31 heats a heat carrier medium in loop 26 which delivers heat to a heat-consumer 32, e.g. a building heating system. The heat exchanger 31 in the loop 26 can be short-circuited during the charging of the storage device 11,12 with available excess energy via a line 29 which ends in a three-way valve 34 which can be switched by a motor 27.

The system according to FIG. 6 operates, for instance, as follows.

During the charging process of the storage device 11,12, the three-way valve 34 is in the flow direction II-I. The heat carrier medium 18, heated up in the heat exchanger 30 flows, circulated by the pump 28, via the three-way valve 34 and the upper part 11 of the tank back to the heat exchanger 30. In this process, heat is transferred from the heat generator 33 to the upper part 11 of the tank via the heat exchanger 30. This heat supply causes desorption of the sorbate 5 from the sorption medium 3 of the storage elements 1 in the manner described.

During the discharging process, the three-way valve 34 has the flow direction III-I. Here, the heat carrier medium 18 then flows in a circuit from the heat exchanger 30, again transported by the pump 28, through the heat exchanger 31 the threeway valve 34, and the upper part 11 of the tank 11 back to the heat exchanger 30. On the one hand, the heat consumer 32 removes heat from the circulating carrier medium 18 heat via the heat exchanger 31 but on the other hand, heat is supplied from the heat generator 33 via the heat exchanger 30 and from the upper part 11 of the tank. The discharging process of the elements 1 in the tank proceeds here in the manner previously described.

It is, of course, also possible to operate the system without the bypass line 29 and the valve 34, then the tank 11,12 is automatically charged if there is an excess of heat supplied by the heat generator 33, and is automatically discharged if there is a deficit in the heat supply.

Figure 7:
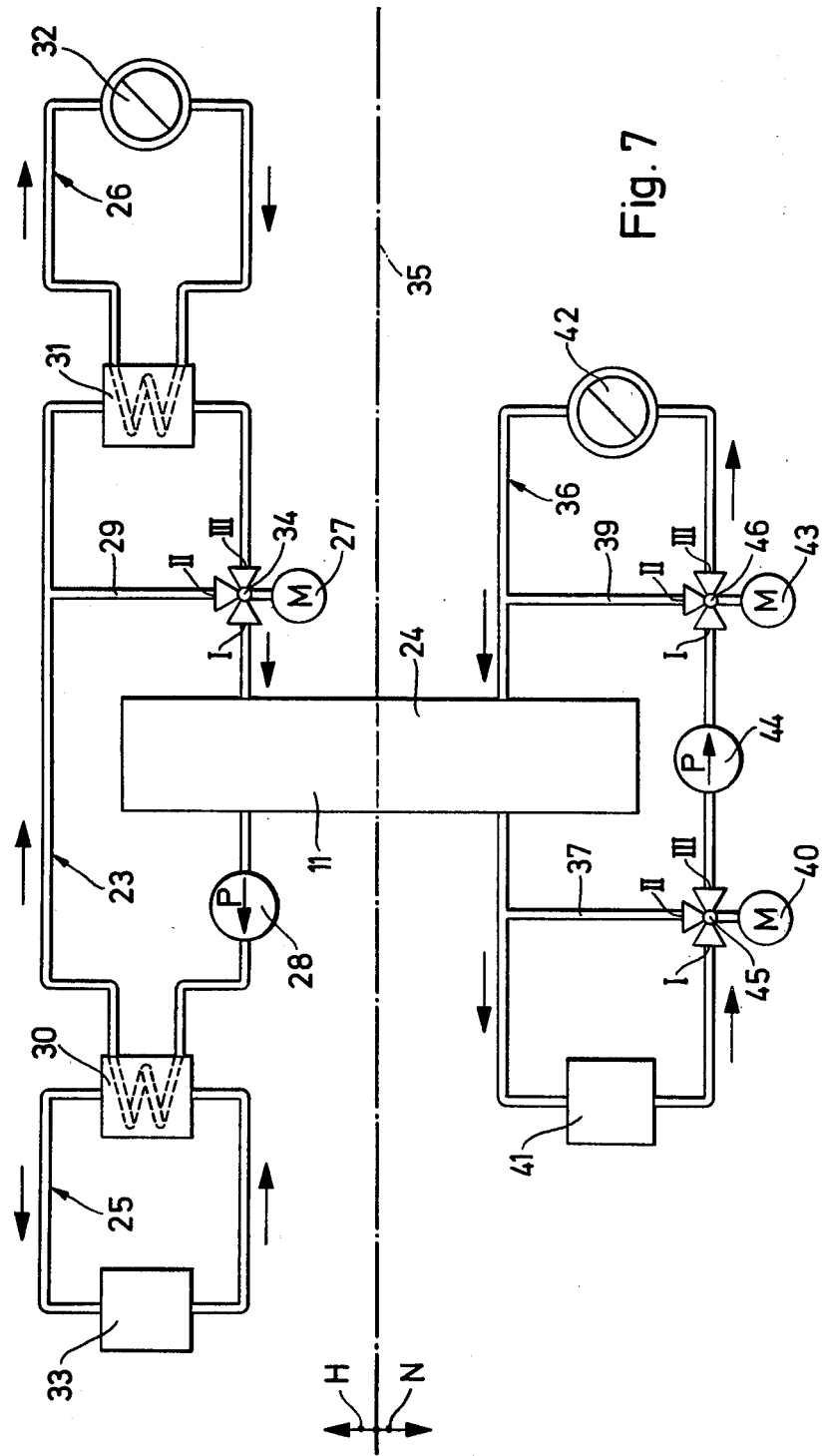
FIG. 7 shows a schematic diagram of a heat storage system utilizing the storage tank shown in FIGS. 4 and 5.

FIG. 7 shows a schematic diagram of a heat storage system utilizing the storage tank shown in FIGS. 4 and 5. The part H situated above a separation line 35 of the system according to FIG. 7, which can also be designated as the "high-temperature part", corresponds to the upper part of the system according to FIG. 6 as to structure and operation. However, in the system according to FIG. 7, the tank 11,12 is replaced by one as shown and described in FIG. 4. The heat carrier medium 22 circulates through the lower part 24 of the tank in a loop 36, in which a heat generator 41 and a heat consumer 42 are disposed directly. The consumer 42, as well as the heat generator 41, can be short-circuited via bypass lines 37 and 39 by means of three-way valves 45, 46, which can likewise be switched by motors 40, 43 during the charging and discharging process of the heat tank.

The flow of the heat carrier medium 22 in the loop 37 which may, for instance be water, is maintained by a pump 44.

For the high-temperature part H, the charging and discharging process takes place as already described. The removal of the condensation heat from the lower part 24 of the tank of the low-temperature part N of the system is accomplished in the following manner: The three-way valve 45 has the flow direction II—III and the three-way valve 46 that of I—III. As a cooling medium, the heat carrier medium 22 is transported by the pump 44 and flows from the lower part 24 of the tank to the consumer 42 (e.g. to a heating system or a utility water heater) via the valve 45 and the valve 46 and is returned to the lower part 24 of the tank.

During the discharging process, the heat generator 41 supplies the heat necessary for the evaporation of the sorbate 5 within the low temperature part N to the part 24 of the tank. For this purpose, the valve 45 has the flow direction I—III and the valve 46 that of I—II. The heat carrier medium 22, now acting as the heating medium, is circulated by the pump 44, from the heat generator 41, again via the valve 45 and the valve 46 to the lower part 24 of the tank and from there, back to the heat generator 41. The heat content of the environment (air, ground, ground water) can be used as the heat required for the evaporation in this system, whereas such heat sources could only be used economically with great difficulty otherwise. It is also possible in some cases to use the waste heat of a refrigerator for this purpose or to take this heat from a solar heat collector.

What is claimed is:

1. A heat storage element for a sorption heat storage system comprising
    a hermetically sealed vessel having a length which is a multiple of its crosswise dimension, said vessel having two subregions defining an interspace therebetween;
    sorbate;
    a first of said subregions containing a solid sorption medium to absorb sorbate; and
    the second of said subregions containing an accumulator to collect, condense and hold back sorbate driven out of said sorption medium.

2. The storage element as claimed in claim 1 where said hermetically sealed vessel has a tubular shape.

3. The storage element as claimed in claim 2 which further comprises a vaporpermeable separation element in said interspace between said subregions.

4. The storage element as claimed in claim 2 where said sorption medium in the first subregion contains a system of flow paths for the gaseous or vaporous sorbate.

5. The storage element as claimed in claim 4 wherein said sorption medium is a porous body with open pores.

6. The storage element as claimed in claim 2 wherein said tubular vessel has a constricted cross section at each interface between said interspace and said sorption medium and said accumulator, respectively.

7. The storage element as claimed in claim 2 wherein said sorption medium contains heat-conducting means.

8. The storage element as claimed in claim 7 wherein said tubular vessel is made of metal and said heat conducting means comprises metal chips connected to said vessel.

9. The storage element as claimed in claim 7 wherein said first subregion of said tubular vessel has internal ribs.

10. The storage element as claimed in claim 1 wherein said tubular vessel is made of a non-metallic material.

11. The storage element as claimed in claim 2 wherein said second subregion in said tubular vessel contains an adsorber.

12. The storage element as claimed in claim 11 wherein said adsorber is activated carbon.

13. The storage element as claimed in claim 11 wherein said adsorber is diatomaceous earth.

14. A heat storage element as claimed in claim 4 wherein said system of flow comprises a longitudinal tube situated in the sorption medium;
said longitudinal tube has a plurality of holes over its entire length and circumference;
an annular elastic tube coaxial with said longitudinal tube and interposed between said longitudinal tube and said sorption medium capable of transmitting vapor and liquid; and
said interspace comprising an impermeable member sealingly connected to the inside walls of said tubular vessel and the outside walls of said longitudinal pipe.

15. A heat storage system comprising
a tank;
a plurality of heat storage elements disposed in parallel in said tank, each said heat storage element comprising a hermetically sealed tubular vessel having a length which is a multiple of its crosswise dimension and two subregions defining an interspace therebetween, sorbate, a first of said subregions containing a solid sorption medium to absorb sorbate, and the second of said subregions containing an accumulator to collect, condense and hold back sorbate driven out of said sorption medium;
means for dividing said tank outside said heat storage elements into at least two regions, said means lying in the plane of said interspaces; and
a heat transfer media contained in said tank in one of said regions outside said storage elements.

16. The heat storage system as set forth in claim 15 which further comprises a means to circulate said heat-transfer media through said tank.

17. The heat storage system as set forth in claim 16 wherein said heat transfer media comprises a liquid having a boiling temperature of higher than the driving-out temperature of said sorbate from said sorption medium at the chosen pressure.

18. The heat storage system as set forth in claim 16 wherein the other of said regions of said tank contains a heat storage medium which undergoes a phase conversion at or lower than the temperature of condensation for sorbate.

19. The heat storage system as set forth in claim 18 further comprising a heat generator and a heat consumer and wherein said means to circulate said heat transfer media includes a piping means connected to said tank to circulate said heat transfer media in selective heat exchange relation with said heat generator and said heat consumer and a pump for pumping said heat transfer media through said piping means.

20. The heat storage system as set forth in claim 19 wherein said heat generator is a refrigeration plant.

21. The heat storage system as set forth in claim 18 wherein the other of said regions of said tank contains a second media for heat exchange and means for circulating said heat exchange media through said other region.

22. The heat storage system is set forth in claim 21 which further comprises a first heat generator and a heat consumer and wherein said means to circulate said heat transfer media includes a piping means connected to said tank to circulate said heat transfer media in selective heat exchange relation with said heat generator and said heat consumer and a pump for pumping said media through said piping means.

23. The heat storage system as set forth in claim 22 which further comprises a second heat generator and a second heat consumer and wherein said means to circulate said heat exchange media includes a piping means connected to said tank, said second heat generator and said second heat consumer to circulate said heat exchange media in selective heat exchange relation with said second heat generator and said second heat consumer, and a pump for pumping said heat exchange media through said piping means.

24. The heat storage apparatus as claimed in claim 15 wherein said means to divide said tank is made of plastic.

* * * * *

UNITED STATES PATENT AND TRADEMARK OFFICE
CERTIFICATE OF CORRECTION

PATENT NO. : 4,135,371

DATED : January 23, 1979

INVENTOR(S) : FRITZ KESSELRING ET AL

It is certified that error appears in the above—identified patent and that said Letters Patent are hereby corrected as shown below:

Column 3, line 1, after "make" insert --a--

Column 5, line 44, change "drivingout" to --driving-out--

Column 7, line 38, change "threeway" to --three-way--

Column 8, line 1, after "heat" insert --storage--

Column 8, line 9, before "tank" insert --storage--

Signed and Sealed this

Twenty-fifth Day of September 1979

[SEAL]

Attest:

LUTRELLE F. PARKER

Attesting Officer     Acting Commissioner of Patents and Trademarks